United States Patent
Stepan et al.

(10) Patent No.: US 9,266,687 B2
(45) Date of Patent: Feb. 23, 2016

(54) SYSTEMS AND METHODS FOR DELIVERY OF DEVICES ALONG A TRANSPORT PATH

(71) Applicant: The Boeing Company, Chicago, IL (US)

(72) Inventors: Michael M. Stepan, Superior, MT (US); Darrell Darwin Jones, Mill Creek, WA (US); Kenneth Paul Zaballos, Burien, WA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 13/925,488

(22) Filed: Jun. 24, 2013

(65) Prior Publication Data

US 2014/0377018 A1    Dec. 25, 2014

(51) Int. Cl.
| | |
|---|---|
| B65G 51/06 | (2006.01) |
| B65G 51/04 | (2006.01) |
| B21J 15/32 | (2006.01) |
| B23P 19/00 | (2006.01) |
| B25B 23/12 | (2006.01) |

(52) U.S. Cl.
CPC ............... B65G 51/04 (2013.01); B21J 15/32 (2013.01); B23P 19/005 (2013.01); B65G 51/06 (2013.01); *B23P 2700/01* (2013.01); *B25B 23/12* (2013.01)

(58) Field of Classification Search
USPC .................................. 406/189, 188; 227/112
See application file for complete search history.

(56) References Cited

U.S. PATENT DOCUMENTS

| | | | | |
|---|---|---|---|---|
| 3,556,282 | A * | 1/1971 | Moeltzner et al. | 198/397.01 |
| 5,636,947 | A * | 6/1997 | Valerino et al. | 406/186 |
| 5,901,966 | A * | 5/1999 | Valerino et al. | 277/548 |
| 6,015,246 | A * | 1/2000 | Yamane et al. | 406/184 |
| 6,688,489 | B2 * | 2/2004 | Bloch et al. | 221/88 |
| 7,500,809 | B2 * | 3/2009 | Menday et al. | 406/188 |
| 8,006,362 | B2 | 8/2011 | Sarh | |
| 8,028,822 | B2 * | 10/2011 | Braunstein | 198/706 |

(Continued)

FOREIGN PATENT DOCUMENTS

| | | |
|---|---|---|
| DE | 4219190 | 7/1993 |
| DE | 19908048 | 8/2001 |
| DE | 10063508 | 7/2002 |

(Continued)

OTHER PUBLICATIONS

Notification of Transmittal of the International Search Report and the Written Opinion of the International Searching Authority for PCT/US2014/040987 mailed Sep. 24, 2014.
Machine translation for JP 2001261154.

*Primary Examiner* — Joseph Dillon, Jr.
(74) *Attorney, Agent, or Firm* — Joseph M. Butscher; The Small Patent Law Group, LLC (57) ABSTRACT

Systems and methods for delivery of device along a transport path are provided. One system includes a transport tube having a feed end and a point of use end and a plurality of device carriers operable to move through the transport tube from the feed end to the point of use end. The plurality of device carriers has a common external surface for operation in the transport tube to allow transport through the transport tube. At least some of the plurality of device carriers has a different internal configuration than at least some of other ones of the plurality of device carriers, wherein the internal configuration is determined based on at least one physical characteristic of a device to be inserted therein.

17 Claims, 7 Drawing Sheets

(56) References Cited

U.S. PATENT DOCUMENTS

| | | |
|---|---|---|
| 8,046,898 B2 * | 11/2011 | Bloch et al. ............... 29/525.01 |
| 8,805,575 B1 * | 8/2014 | Bloch et al. ................. 700/219 |
| 2005/0006427 A1 * | 1/2005 | Bloch et al. ................. 227/112 |

FOREIGN PATENT DOCUMENTS

| | | |
|---|---|---|
| EP | 1077114 | 2/2001 |
| GB | 2429183 | 2/2007 |
| JP | 2001261154 | 9/2001 |

\* cited by examiner

SYSTEMS AND METHODS FOR DELIVERY OF DEVICES ALONG A TRANSPORT PATH

BACKGROUND

The present disclosure relates generally to systems and method for delivery of devices along a transport path, such as fastening equipment systems for delivering fasteners to a workpiece, for example, a portion of an aircraft.

In the production assembly of aircraft, for example, the substructure of aircraft, such as fuselage frames, along with wing spars and ribs, are joined to the skin of the aircraft with thousands of fasteners. These fasteners are of a multitude of types having variations in diameters and grip lengths. The installation of fasteners in relatively large aircraft substructures and skins is typically performed either manually or by automated fastening equipment.

Delivery systems for delivering the fasteners to the workpiece of the aircraft generally include a storage device for the fasteners and a mechanism or system that transports fasteners from the storage device to the workpiece or fastening device. For example, in some known systems, a suction head (that forms part of a pneumatic system) removes fasteners from a storage area and delivers the fasteners through a delivery tube using a vacuum. The fasteners are individually stored in holes of a predetermined or fixed depth, and only one fastener may be stored in any given hole. Accordingly, each hole contains a fastener of a specific configuration, diameter, and grip length.

The fastener delivery system generally includes a number of tubes that are used to transport the fasteners of different sizes (in different transport tubes) from one location to another. For example, in conventional fastener delivery systems, one tube is provided for the delivery of each specific size of product, for example, bolts, nuts, etc. Thus, because of the large number of different sizes of fasteners, a large number of transportation tubes (having different diameters) are used from a holding area to the aircraft, for example, from a general station to a point of use station at the aircraft. As the number of different types and sizes of fasteners used increases, the number of tubes increases, resulting in a very large system of tubes that can become unmanageable quickly. In some instances, the number of tubes needed is not simply cumbersome, but not possible to implement because of space constraints. Additionally, in cases where an end point of use station is situated along a portion of the aircraft, such as the wing while the wing is being drilled and prepared for the various fasteners, having a large number of tubes, such as banded together, is cumbersome and sometimes unmanageable, or makes difficult maneuvering the end point of use station along the wing.

SUMMARY

In accordance with one embodiment, a transport system is provided that includes a transport tube having a feed end and a point of use end and a plurality of device carriers operable to move through the transport tube from the feed end to the point of use end. The plurality of device carriers has a common external surface for operation in the transport tube to allow transport through the transport tube. At least some of the plurality of device carriers has a different internal configuration than at least some of other ones of the plurality of device carriers, wherein the internal configuration is determined based on at least one physical characteristic of a device to be inserted therein.

In accordance with another embodiment, a method for transporting a plurality of devices to a point of use via a transport tube is provided, wherein at least some of the plurality of devices having different physical characteristics from other ones of the plurality of devices. The method includes receiving each of a plurality of the devices within a feed end of the transport tube, wherein the plurality of devices are disposed within a plurality of carriers configured to conform to different physical characteristics of the plurality of devices. Each carrier also has an external surface configured for operation within the transport tube. The method further includes causing each of the plurality of devices to move along the transport tube from the feed end to the point of use.

The features and functions discussed herein can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide systems and methods for transport or delivery of products or devices, which in one embodiment are fasteners for an aircraft (e.g., production assembly of an aircraft). For example, a device carrier, such as a universal carrier, is provided for transporting fasteners of different types having variations in diameters and grip lengths along the same transport tube, which may be any type of conduit that allows for transporting fasteners from one location to another location. Thus, by practicing various embodiments, a reduced number of transport tubes may be provided, which in some embodiments, includes using a single transport tube or single transport tube size diameter (instead of a plurality of transport tubes having different diameters). The carrier is configured as a common transport device that accommodates receiving therein different types and sizes of fasteners. In some embodiments, the inner receiving portion of the carrier may be adjustable for receiving therein different sizes of fasteners. In other embodiments, different carriers are provided having the same outer configuration (e.g., diameter), but different inner configuration (e.g., diameters) to accommodate and maintain therein different types and sizes of fasteners. In these embodiments, the carrier may be sized based on a maximum device size to be transported as described herein.

Figure 1:
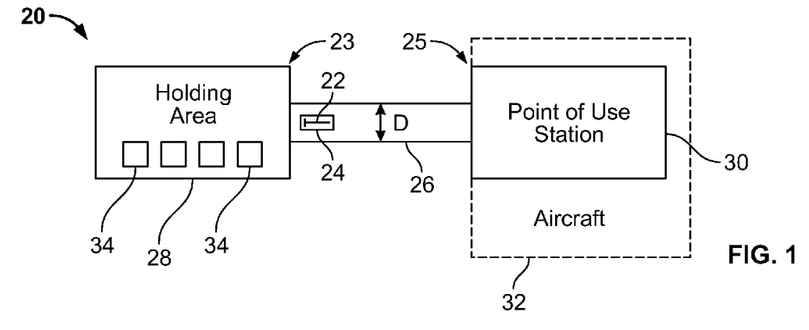
FIG. 1 is a block diagram illustrating a transport system in accordance with an embodiment.

In particular, FIG. 1 illustrates a transport system, which in this embodiment is a fastener transport system 20. In the illustrated embodiment, the fastener transport system 20 is configured for transporting fasteners in an aircraft application. However, various embodiments may be used to move object types of objects or devices, as well as for non-aircraft applications. Thus, while various embodiments may be described in connection with a particular application, such as an aircraft application, the various embodiments may be used in different applications, such as for transporting objects for land, air, sea and pressurized space applications, as well as non-transport or non-mobile platform applications. Additionally, the various embodiments may be used with different types of transport means for moving the devices from one location to another.

The fastener transport system 20 may be, for example, a pneumatic material transport system that includes a reduced number of transport tubes for transporting objects, which in the illustrated embodiment are fasteners 22 for an aircraft (e.g., bolts, screw, rivets, etc.). As shown, the fasteners 22 are received within a device carrier, referred to herein as a universal carrier 24, that is configured to move along a transport channel or path, illustrated as a transport tube 26, from a first location to a second location located a distance from the first location. In the illustrated embodiment, the first location is a holding area 28 (which in various embodiments includes a feed end 23 of the transport tube 26) and the second location is an end point of use station 30 (which defines a point of use end 25 of the transport tube 26), which may be located at an aircraft 32, for example, on a wing of an aircraft while the wing is being drilled and prepared for coupling the various fastener(s) 22.

As can be seen in FIG. 1, the fastener transport system 20 includes a single transport tube 26 that accommodates transporting fasteners 22 of different sizes using the universal carrier 24. It should be noted that more than one transport tube 26 may be provided, for example, going to different locations of the aircraft 32, such as to different end of point use stations 30. In general, a reduced number of transport tubes 26 are provided wherein fasteners 22 of different configuration or sizes are transported through the same transport tube 26.

For example, the holding area 28 may include a plurality of storage portions 34 (e.g., storage bins) that store fasteners of different sizes. In one embodiment, the universal carrier 24 is sized to have a diameter to accommodate (e.g., slightly larger) the largest fastener 22 (e.g., largest width of fastener) to be transported through the transport tube 26. Thus, for example, the inner structure of the universal carrier 24 may be adjustable or may be made differently to receive and maintain therein different sizes of fasteners 24. In the illustrated embodiment, the inner diameter (D) of the transport tube 26 is sized and shaped to receive therein and allow movement therethrough of the universal carrier 24. For example, in one embodiment, the diameter (D) of the transport tube 26 is large enough (e.g., slightly larger) than the outer diameter of the universal carrier 24, which is defined by the largest fastener to be transported plus the width or diameter of the housing of the universal carrier 24. Thus, the universal carrier 24 remains common to the fastener transport system 20. It should be noted that different sized transport tubes 26 may be used in relation to different locations based on the size of the largest fastener 22 to be transported. It should also be noted that the holding area 28 may be configured to allow for manual or automatic selection and delivery of the fasteners 22 through the transport tube 26.

Figure 2:
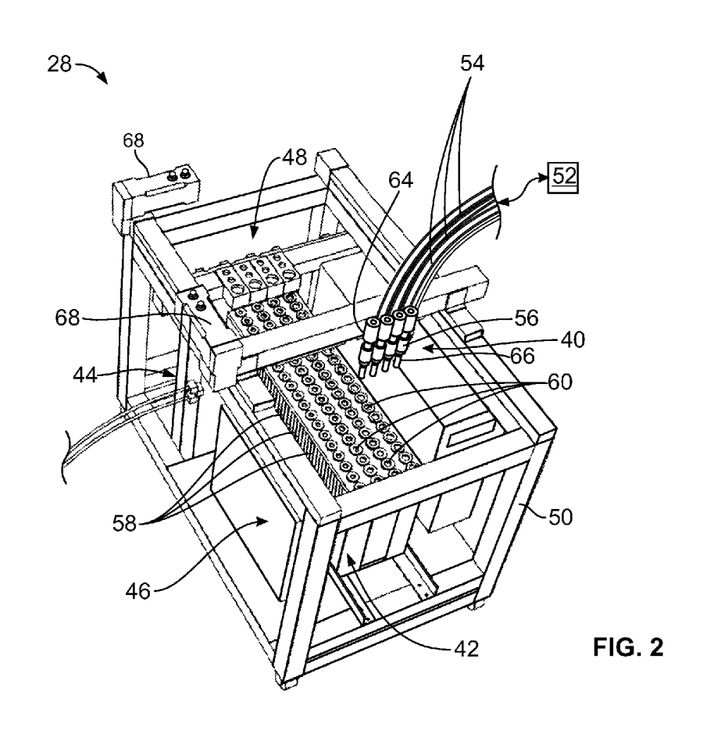
FIG. 2 is a diagram illustrating a device holding area having a feed end of a transport system in accordance with an embodiment.

As shown in FIG. 2, the holding area 28 in one embodiment generally includes an unloading mechanism 40 in communication with a fastener storage device 42 (which may include the storage portions 34 (shown in FIG. 1), wherein a control system 46 causes the unloading mechanism 40 to remove a fastener 22 (shown in FIG. 1 and which may be preloaded in the universal carrier 24) having a specific configuration from the fastener storage device 42 and transport the fastener 22 to a delivery conduit 48 (illustrated as the transport tube 26 in FIG. 1), wherein the fastener 22 is delivered to a work station, such as the end point of use station 30 (shown in FIG. 1). As shown, the holding area 28 may be disposed within a portable platform, such as a mobile cart 50, so that a variety of fasteners 22 may be delivered to a plurality of workstations located throughout a manufacturing facility.

The holding area 28 generally removes and delivers fasteners using a pneumatic source 52. In one particular embodiment, the pneumatic source 52 is shop air at, for example, 90 psi (pounds per square inch). The pneumatic source 52 may be activated by the control system 46 and is in communication with both the unloading mechanism 40 and the delivery conduit 48 through flexible tubing 54. The fittings that connect the pneumatic source 52 and the flexible tubing 54 are not shown for clarity. The pneumatic source 52 activates one or a plurality of vacuum generators 56 to remove a fastener from the fastener storage device 42 and secure the fastener within the unloading mechanism 40. The fastener storage device 42 may include a plurality of tubes 58. The tubes 58 may include seals 60 for engaging the unloading mechanism 40. Once the fastener 22 is secured within the unloading mechanism 40, the control system 46 positions the unloading mechanism 40 adjacent the delivery conduit 48, wherein the vacuum generators 56 are deactivated and the fastener 22 is transported through the delivery conduit 58 by gravity and by pressurized air from the pneumatic source 52.

Generally, a fastener 22 is transported through the delivery conduit 48 (which may be embodied as or connected to the transport tube 26 shown in FIG. 1) by gravity until the fastener 22 passes beyond a proximity sensor (not shown). When the proximity sensor detects the presence of a fastener 22, the proximity sensor notifies the control system 46, and the control system 46 then activates the pneumatic source 52. Accordingly, the pneumatic source 52 provides pressurized air through the transport tube 26 to deliver the fastener to the workstation. It should be noted that the workstation may include an end effector suitable for installing the fastener 22 as described in more detail herein.

It should also be noted that the transport tube 26 may be fabricated from any suitable material. For example, in some embodiments, the transport tube 26 is fabricated from flexible tubing so that the fastener 22 may be delivered to a plurality of workstations throughout a manufacturing facility. In some embodiments, the transport tube 26 is fabricated from a relatively soft and flexible plastic such as nylon with a relatively smooth inner surface to minimize friction between the fastener 22 and the inner wall of the transport tube 26.

In various embodiments, the length of the transport tube 26 may be varied to accommodate the distance from the holding area 28 to the workstation. It should be noted that the amount of time that the pneumatic source 52 provides pressurized air through the transport tube 26 is a function of the length of the transport tube 26 and the fastener configuration being delivered. Therefore, the amount of time that pneumatic source 52 is activated is adjusted according to the length of the transport tube 26.

The unloading mechanism 40 generally comprises an extractor tool 64 having an extractor catcher 66 attached thereto. It should be noted that any number of extractor tools 64 and vacuum generators 52 may be provided to remove fasteners 22 in accordance with specific operating requirements.

Generally, the unloading mechanism 40 is positioned adjacent the fastener storage device 42 using a linear X-Y positioner 68 that is activated by the control system 46. More specifically, the linear X-Y positioner 68 positions the extractor catcher 66 of the unloading mechanism 40 adjacent the appropriate fastener storage tube 58 that contains a desired or requested fastener 22 (which may be performed automatically, semi-automatically, or manually). Accordingly, the X and Y position of each fastener storage tube 58 is stored within the control system 46. Additionally, the extractor tool 64, along with the extractor catcher 66 attached thereto, may be translated in the vertical direction with a vertical axis positioner (not shown). The extractor catcher 66 is translated in the vertical direction in order to engage the extractor catcher 66 with the fastener storage tube 58 for removal of the fastener 22. Moreover, the vertical axis positioner may be pneumatically controlled and is therefore activated by the pneumatic source 52.

In operation, the control system 46 activates the linear X-Y positioner 68 to position the unloading mechanism 40 adjacent the fastener storage device 42, and more specifically, to position the extractor catcher 66 adjacent the appropriate fastener storage tube 58. Once the proper extractor catcher 66 is positioned adjacent the appropriate fastener storage tube 58, the vertical axis positioner moves the extractor tool 54 in the vertical direction until the extractor catcher 66 abuts the seal 60. Once the extractor catcher 66 is positioned against the seal 50 of the appropriate fastener storage tube 58, the pneumatic source 52 then activates the vacuum generators 56, and as a result, one or more of the fasteners 22 within the fastener storage tube 58 moves up against the extractor catcher 56. Once the universal carrier 24 in which the fastener 22 is maintained abuts the extractor catcher 66 as shown, a seal may be created at the interface between the top of the universal carrier 24 and the extractor catcher 66, thereby causing the universal carriers 24 to drop back into the fastener storage tube 58. As a result, the unloading mechanism 40 removes the top universal carrier 24 with the fastener 22 therein from the fastener storage device 42.

It should be noted that the holding area 28 and operation thereof to select and obtain a fastener 22 for transport is merely exemplary. In particular, different mechanisms or devices may be used to obtain the fastener 22 for transport, including other automatic, semi-automatic, or manual means.

Figure 3:
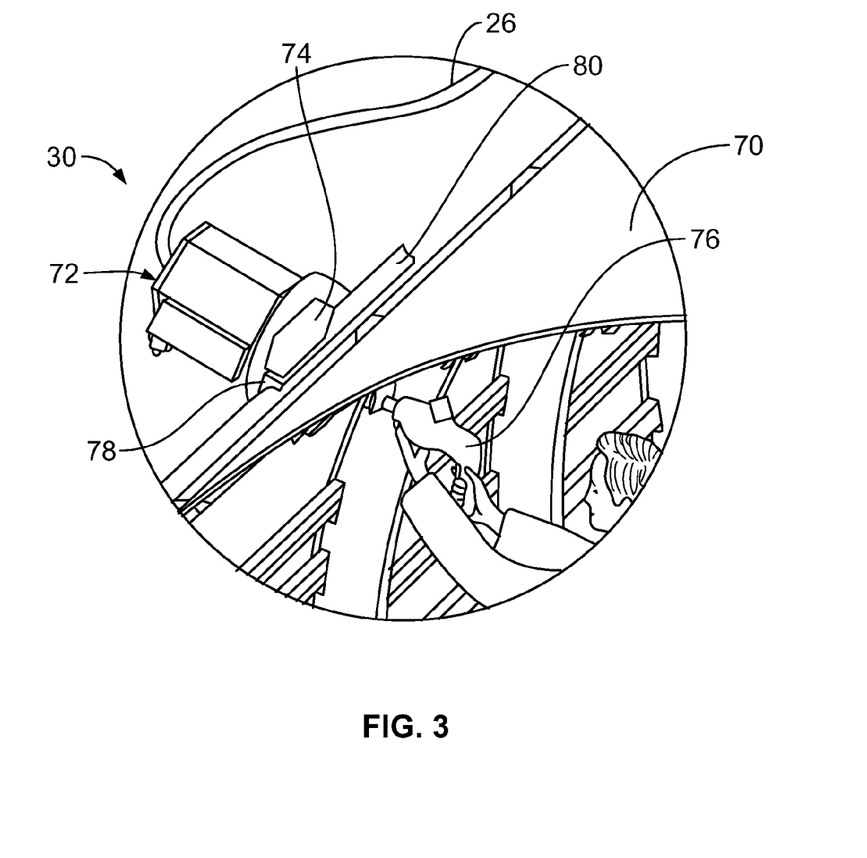
FIG. 3 is a diagram illustrating an end point of use station of a transport system in accordance with an embodiment.

FIG. 3 illustrates an example of the end point of use station 30 that may receive fasteners 22 through the transport tube 26. It should be noted that although the end point of use station 30 is shown with a fuselage section 70 of an airframe, the end point of use station 30 may be positioned or located, for example, at a wing section of an airframe as part of an installation system.

The end point of use station 30 includes an automated machine 72 disposed on one side of the workpiece (e.g., fuselage or wing), also referred to as a first side of the workpiece, and a hand-held tool 76 disposed on the other side of the workpiece, or along a second surface of the workpiece. The automated machine 72 may be supported on a guide structure (not shown) that can be releasably attached to the workpiece, such as having guide rails.

The automated machine 72 further comprises an end effector 74 that is used to perform operations such as drilling a hole through the workpiece and installing the transported fastener 22 into a hole (once removed from the universal carrier 24). The end effector 74 is supported within an end effector carriage 78 that rides along, for example, rails 80. The fastener feed unit, which may be the holding area 28 (shown in FIGS. 1 and 2), is positioned at a fixed location remote from the end point of use station 30, while the end effector carriage 78 rides along the rails 80 to install fasteners 22. The end effector 24 may include, for example, a drill and conduit (both not shown) through which fasteners 22 in the universal carriers 24 are delivered from the holding area 28. As another example, a riveter, which may be an electromagnetic riveter (EMR) or other device for use in installing other types of fasteners 22, such as hi-loks or jo-bolts, among others, may be provided. The end effector 74 may also comprise, for example, an impact hammer or the like for forcing a lock bolt or similar type of fastener through a hole drilled through the workpiece. Any one of the various tools of the end effector 74 can be moved into a working position aligned with a target location on a workpiece where a fastener 22 is to be installed, while the other tools are held in stand-by position, and the selected tool can be operated to perform an operation on the workpiece. Operation of the end effector 74 and the hand-held tool 76 may be performed as known in the art.

Figure 4:
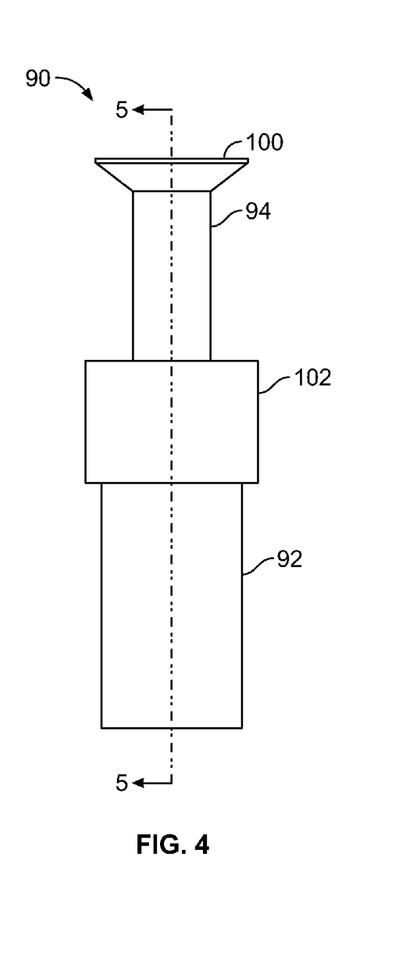
FIG. 4 is a diagram of a device carrier in accordance with an embodiment.
Figure 5:
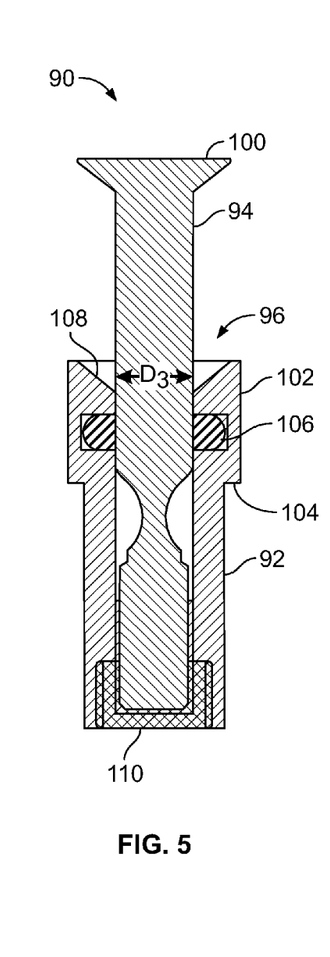
FIG. 5 is a diagram of a cross-section of the device carrier of FIG. 4 taken along the line 5-5 and showing a device interested therein.
Figure 6:
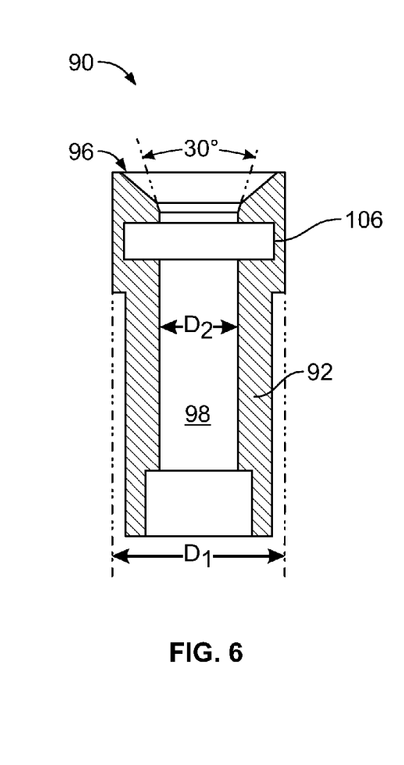
FIG. 6 is a diagram of a cross-section of the device carrier of FIG. 4 taken along the line 5-5 of the device carrier of FIG. 4 without a device inserted therein.

FIGS. 4 through 6 illustrate a universal carrier 90, which in some embodiments, is embodied as the universal carrier 24 (shown in FIG. 1). The universal carrier 90 defines a transport arrangement for different sizes of fasteners that may be transported through a single transport tube, such as the transport tube 26 (shown in FIG. 1). The universal carrier 90 generally includes a body 92 having a common outer surface or dimension for maintaining therein a fastener 94. As described in more detail herein, while the outer dimension of the universal carrier 90 (e.g., the outer diameter) is the same for transporting fasteners 22 of different types (e.g., different widths or heights), the inner configuration of the universal carrier 90 is different depending on the fastener 22 to be secured therein for transport.

The body 92 of the universal carrier 90 in the illustrated embodiment has a generally cylindrical shape that is complementary to the inner cross-section of the transport tube 26 through which the universal carrier 90 is to be transported.

Accordingly, the size and shape of the body of the universal carrier 90 may be varied as desired or needed based on the configuration of the transport tube 26. For example, the outer cross-section of the body 92 may be non-circular, such as rectangular or octagonal, among other shapes. Additionally, the body 92 may be formed from any suitable material. In some embodiments, the body 92 is formed from nylon or a similar material, such as other synthetic polymers. In other embodiments, the body 92 may be formed, for example, from a plastic or similar material. In general, the body 92 is formed from a material that allows for movement of the universal carrier 90 through and along the transport tube 26, such as to allow smooth movement through the transport tube 26. It the illustrated embodiment, the outer diameter ($D_1$) of the universal carrier 90 is complementary to the diameter of the transport tube 26, for example, slightly smaller than the transport tube 26.

The body 92 generally includes an opening 96 at one end for receiving therein a fastener 22, which in the illustrated embodiment is a bolt 94 (e.g., a swage bolt). However, any type of fastener 22 may be transported in accordance with various embodiments (e.g., screws, pins, hi-lok fasteners, among others). As can be seen, the inner diameter ($D_2$) of a bore 98 within the body 92 is dimensioned to have a diameter that allows for receiving therein the bolt 94. For example, in some embodiments, the diameter of the bore 98 is slightly larger than the diameter ($D_3$) of the bolt 94, such that the bolt 94 can slide into the bore 98. It should be noted that the length of the bore 98 may be sized to accommodate insertion therein of all or a portion of the length of the bolt 94. Thus, when the bolt 94 is inserted into the bore 98, the head 100 of the bolt 94 may extend beyond the top of the body 92 as illustrated. However, in other embodiments, the head 100 of the bolt 94 is flush or co-planar with a top of the body 92.

In the illustrated embodiment, the body 92 includes a flange 102 having a diameter greater than the remainder of the body 92. In the illustrated embodiment, the flange 102 defines a top portion of the body 92 having the opening 96 for receiving the bolt 94 into the bore 98. As can be seen, the flange 102 (or collar) defines a shoulder 104 (or ledge) along an outer surface of the body 92. However, in some embodiments, the entire body 92 has the same outer diameter. In one embodiment, the flange 102 includes therein, surrounding the bore 98, a retaining member 106 that is configured to facilitate securing and maintaining the bolt 94 within the bore 98. For example, the retaining member 106 in the illustrated embodiment is a gasket (e.g., an O-ring) such as formed from an elastomer and having an inner diameter slightly smaller than the diameter of the bolt 94. Thus, when the bolt 94 is inserted within the bore 98, the retaining member 106 holds the bolt 94 is position, such as to prevent the bolt 94 from exiting or slipping out from the bore 98. It should be noted that different types of retaining members 106 may be used, for example, a spring or other member that provides pressure or friction against the bolt 94 wherein inserted within the bore 98.

In some embodiments, the opening 96 into the bore 98 is sized or shaped to accommodate the size and shape of the head 100 of the bolt 94. For example, the opening 96 may include angled walls 108 that are complementary to and receive therein the head 100 of the bolt 94, such as in an abutting arrangement.

Figure 7:
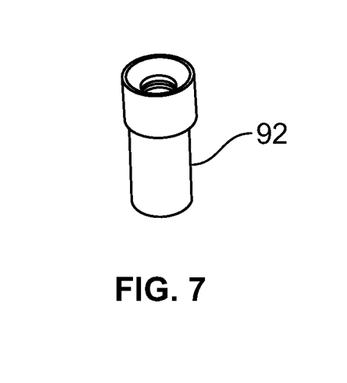
FIG. 7 is a perspective view of a device carrier in accordance with an embodiment.
Figures 8, 10, 11:
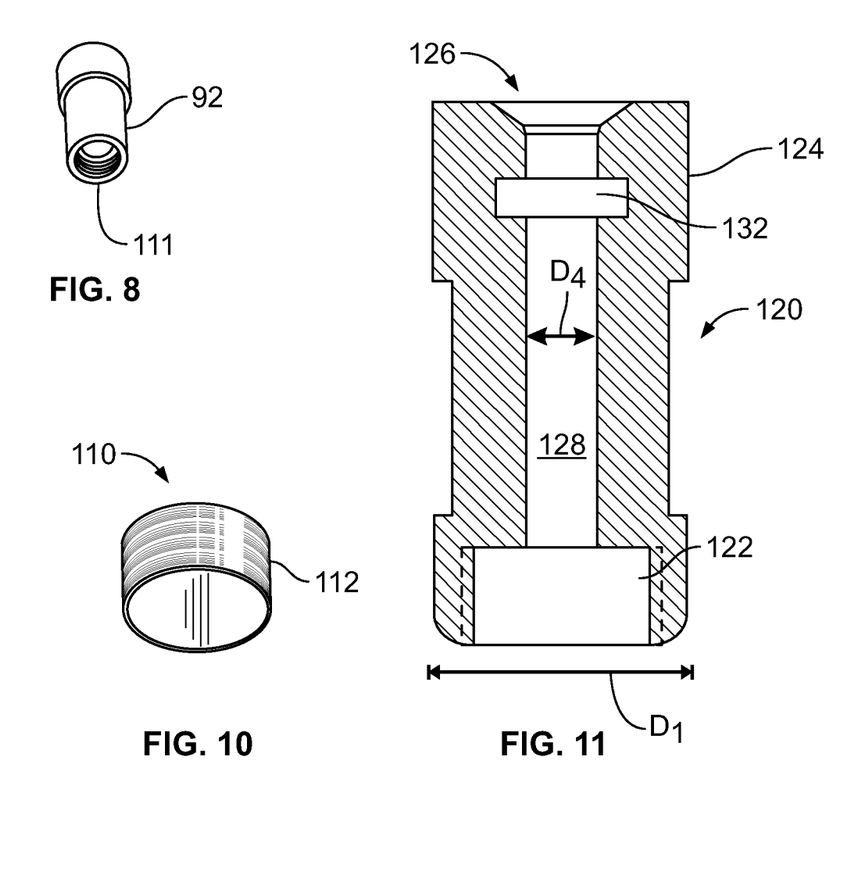
FIG. 8 is another perspective view of a device carrier in accordance with an embodiment.
FIG. 10 is another perspective view of the end plug of FIG. 9.
FIG. 11 is a cross-sectional view of a device carrier in accordance with another embodiment.
Figure 9:
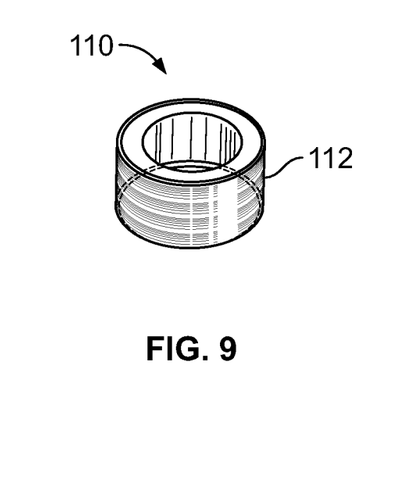
FIG. 9 is a perspective view of an end plug in accordance with an embodiment.

Additionally, opposite the opening 96, namely at an opposite end of the body 92 (and bore 98), a plug 110 (or end plug) is provided. The plug 110 may define the bottom of the bore 98 and prevent the bolt 94 from extending through the bottom of the universal carrier 90 during transport. In some embodiments, the plug 110 is formed from a different material than the body 92. For example, in one embodiment, the plug 110 is formed form a metal (e.g., steel) or a material that is magnetically attracted. It should be noted that the plug 110 in some embodiments has a cup shaped configuration such that at least a portion of the bolt 94 extends into the plug 110, when the plug is attached to the body 92. The plug 110 may be secured within a bottom opening of the body 92 using and adhesive or other bonding material. In other embodiments, for example as shown in FIG. 8, the bottom 112 of the body 92 may be internally threaded (e.g., having threads 111) to engage external threads 112 of the plug 110 as shown in FIGS. 9 and 10. FIG. 7 illustrates a top portion the body 92.

It should be noted that in some embodiments, the plug 110 may be formed from the same material as the body 92 and also may be integrally formed with the body 92, for example, as a single unitary piece.

As discussed herein, universal carriers may be configured to allow transport of different size fasteners 22. Thus, for example, FIG. 11 illustrates a universal carrier 120 that may be used to transport different size fasteners 22 along the same transport tube 26. For example, as can be seen, the diameter ($D_1$) of the universal fastener 110 is the same as the diameter ($D_1$) of the universal fastener 90. In particular, at the widest point, the universal fasteners 90 and 110 have the same diameter, which corresponds to the flange 102 and the flanges 122 and 124, respectively. However, as can be seen, the inner diameter ($D_4$) of a bore 128 of the universal fastener 110 is smaller than the bore 98 of the universal fastener 90 to accommodate a fastener 22 having a smaller diameter body. Thus, in this embodiment, the body 130 of the universal fastener 110 is made thicker to accommodate a narrower fastener 22 therein. Additionally, it should be noted that the length of the bore 128 is the same in the illustrated embodiment, but may be different as described in more detail herein.

Additionally, the opening 126 may be sized and shaped differently, such as based on the type of fastener 22 to be received within the universal fastener 110. Additionally, a region 132 for a retaining member may be made smaller to accommodate a smaller member than the retaining member 106 shown in FIG. 5. However, different sizes (e.g., widths and thickness) and shapes of retaining members may be used as desired or needed. Additionally, the plug 110 may also be provided on the bottom of the universal carrier 110.

Accordingly, in various embodiments, the fastener transport system 20 allows transport of a plurality of different types and/or sizes of fasteners 22 using one or more universal carriers that all have a common external surface for operation in the fastener transport system 20. Some of the universal carriers have interior portions that are differently configurable or malleable such that a plurality of different universal carriers or a single one of the universal carriers is configured to accept and receive therein any one of the plurality of fasteners exhibiting different physical characteristics, which in some embodiments is a different size and/or shape, for example. It should be noted that although the universal carriers described in various embodiments are configured and used to transport fasteners for an aircraft application, various embodiments may be used to transport different devices, as well as in aircraft and non-aircraft applications.

It also should be noted that depending on the fastener or device to be transported by a particular one of the universal fasteners, an indicia may be provided on an external surface thereof. For example, the external surface of the body 92 and 130 (as shown in FIGS. 5 and 11) may include visible indicia to identify and indicate to a user the fastener that may be or is inserted therein as, for example, once inserted therein, it may be difficult to determine the type or size of fastener. The indicia may be any type of marking or indicator, such as along a portion or all of the body 92. Thus, the indicia may be a color coding or marking (e.g., letters and/or numbers), such as a colored band or marking around a portion of the body 92 and 130, or the entire body 92 and 130 may be colored or marked differently. In some embodiments, the body 92 and/or 130 may be made, for example, from a material that allows a user to view the fastener therein (e.g., made from a translucent material).

Thus, in various embodiments, different universal carriers, while having the same common external surface, may be differently configured internally to accept and transport different types and/or sizes of fasteners, for example. In some embodiments, as shown in FIGS. 5 and 11, the universal carriers 90 and 120 may have a fixed internal configuration to accept therein fasteners matching that configuration, which may include one or more different fasteners (e.g., fasteners having the same or different diameter or width, and having the same or different height). Thus, in these embodiments, for example, the wall of the body 92 and 130 may be made thicker to accommodate different diameter fasteners therein. In other embodiments, the thickness of the walls of the bodies of a plurality of universal carriers may be the same and an insert or adapter provided to insert within the bores of the universal fasteners to define different internal configuration (e.g., different shape or size). For example, the insert or adapter may be inserted within the bore or around a fastener before insertion into the universal carrier to adapt a particular universal carrier to accept different types and/or sizes of fasteners. It should be noted that the insert or adapter may be removably or fixedly secured within the universal carrier.

Figure 12:
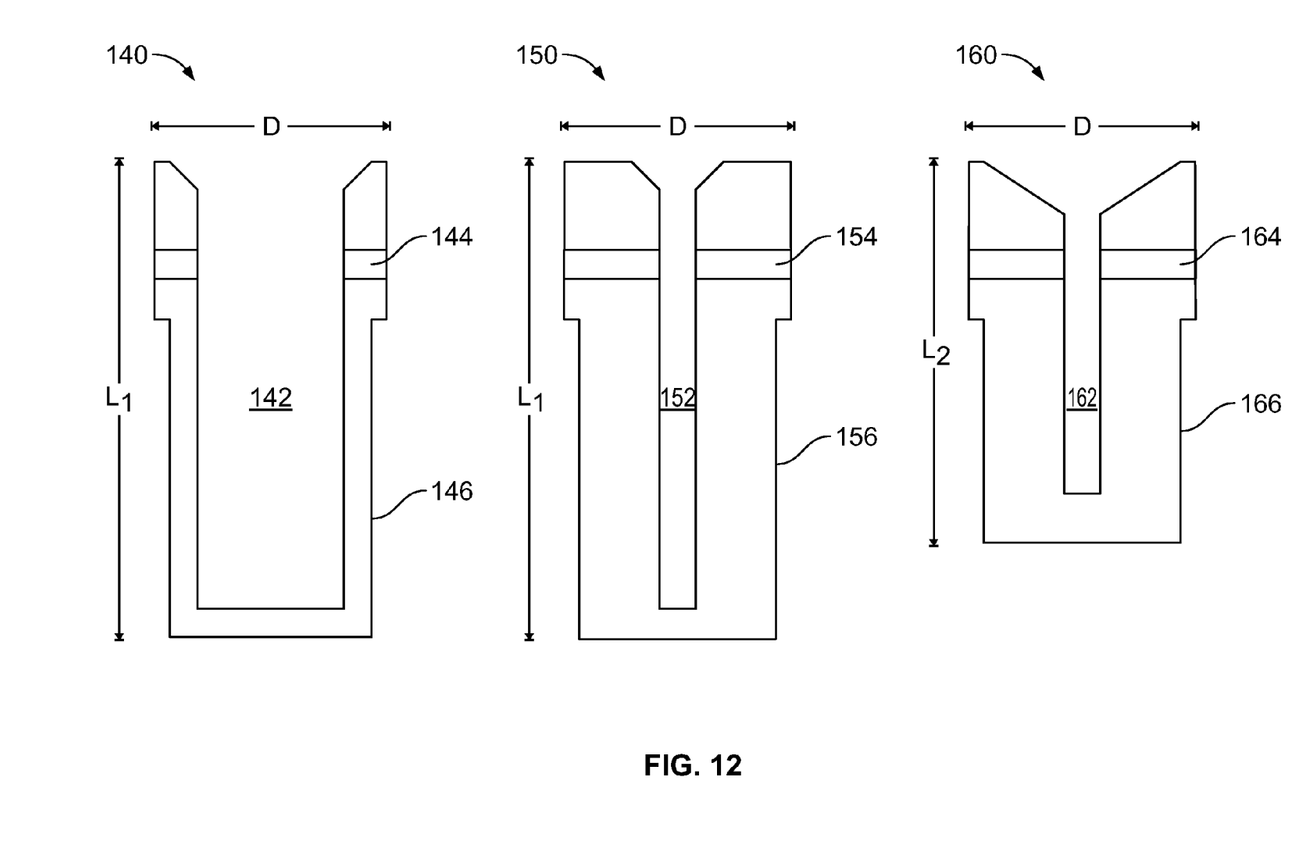
FIG. 12 is a diagram of device carriers having different internal configurations in accordance with an embodiment.

Thus, in various embodiments, one or more properties or characteristics of an external surface of the universal carriers is made common for operation in the same transport tube, which in the embodiment of FIG. 12, defines a common outer diameter, namely universal carriers 140, 150, and 160 having the same diameter (D) at the largest width or diameter of the bodies 146, 156, and 166 (such as at a flange portion thereof). However, it should be noted that other external surfaces of the universal carriers 140, 150, and 160 may be the same or different. For example, the cross-sectional shapes may be the same and the lengths of the universal carriers 140, 150, and 160 may be the same (or different). Additionally, and for example, the main portions of the bodies 146, 156, and 166 may be the same size or different sizes and/or the flanges or other portions may be the same size or different sizes. However, in various embodiments, the external surface of the bodies 146, 156, and 166 that is to be complementary to the transport tube are made the same. Thus, in FIG. 12, the universal carriers 140, 150, and 160 are configured to allow transport through a transport tube having the same inner diameter.

As can be seen in FIG. 12, while the universal carriers 140, 150, and 160 have the same external diameter, the internal configuration of the universal carriers 140, 150, and 160 is different. In the illustrated embodiment, the bores 142, 152, and 162 of the universal carriers 140, 150, and 160 have different dimensions, which may be a different width (diameter (D) in the embodiment), such as illustrated by the universal carriers 140 and 150, and/or a different length, such as illustrated by the universal carriers 150 and 160. As can be seen, the universal carrier 160 also has a shorter length ($L_2$) that the length ($L_1$) of the universal carriers 140 and 150. However, in some embodiments, the lengths of all of the universal carriers 140, 150, and 160 may be the same, with the length of the internal bores 142, 152, and/or 162 of one or more of the universal carriers 140, 150, and 160 being different. Additionally, the retaining members 144, 154, and 164 of the universal carriers 140, 150, and 160, respectively, may be the same or different size, and or positioned at the same or different axial locations along the bodies 146, 156, and 156 of the universal carriers 140, 150, and 160.

Figure 13:
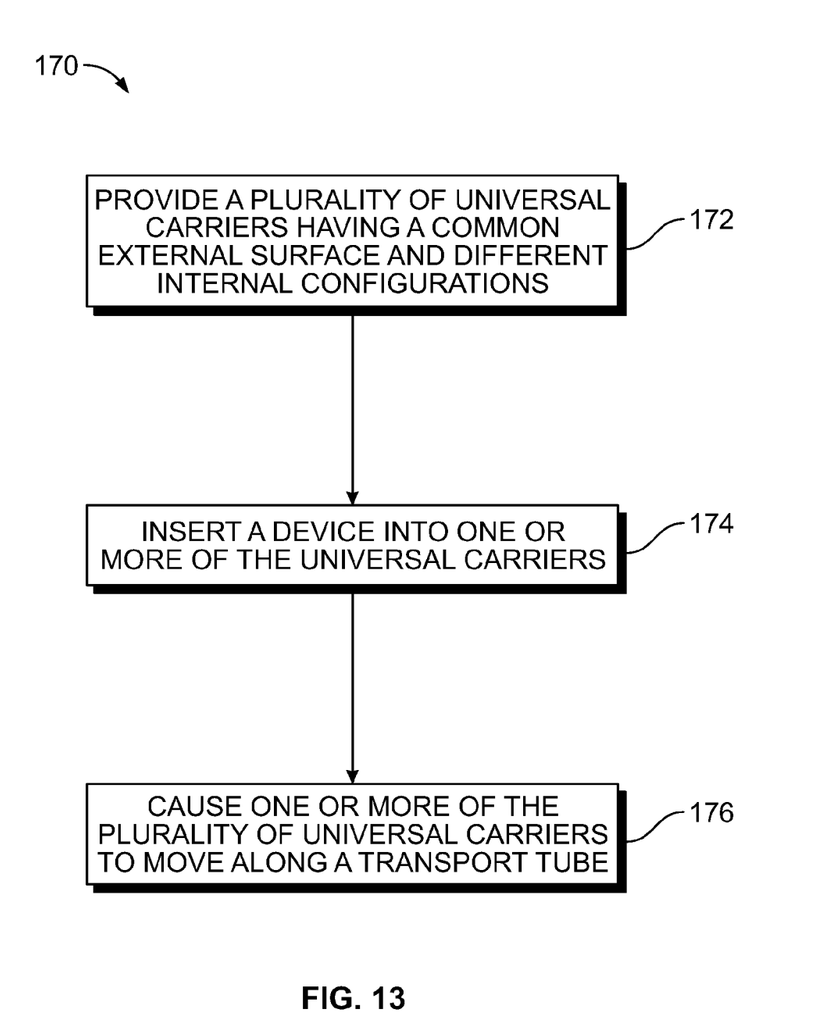
FIG. 13 is an illustration of a process for transporting devices in accordance with various embodiments.

Various embodiments also provide a method 170 as illustrated in FIG. 13 for transporting a device, such as a fastener, using for example the fastener transport system 20 (shown in FIG. 1). However, the method 170 may be used in connection with other systems, such as pneumatic material transport systems for transporting different devices or materials. Thus, the method 170 may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 170 includes providing a plurality of universal carriers at 172 having a common external surface and different internal configurations, for example, as described in more detail herein. In some embodiments, the external surface is formed to match or be complementary with the internal surface of a transport tube. Additionally the internal configuration is provided to accept a particular device, such as a type and/or size of fastener, which may exhibit one or more different physical characteristics. In some embodiments, a plurality of sets of universal fasteners may be provided, for example, all having a common external surface for operation in the transport tube (e.g., having at least one common dimension), but each set having a different internal configuration based on particular physical characteristics of a device to be transported using the universal carrier.

The method 170 also includes inserting a device into one or more of the universal carriers at 174. For example, as described herein, a fastener may be inserted or loaded into one or more of the universal carriers, such as loading different fasteners into different universal carriers having a complementary interior configuration to the particular fastener.

The method 170 additionally includes causing one or more of the plurality of universal carriers to move along the transport tube at 176. For example, using air pressure or other sources of pressure or force, one of the universal carriers is moved from a feed end to a point of use end (e.g., at a workpiece of an aircraft).

Figure 14:
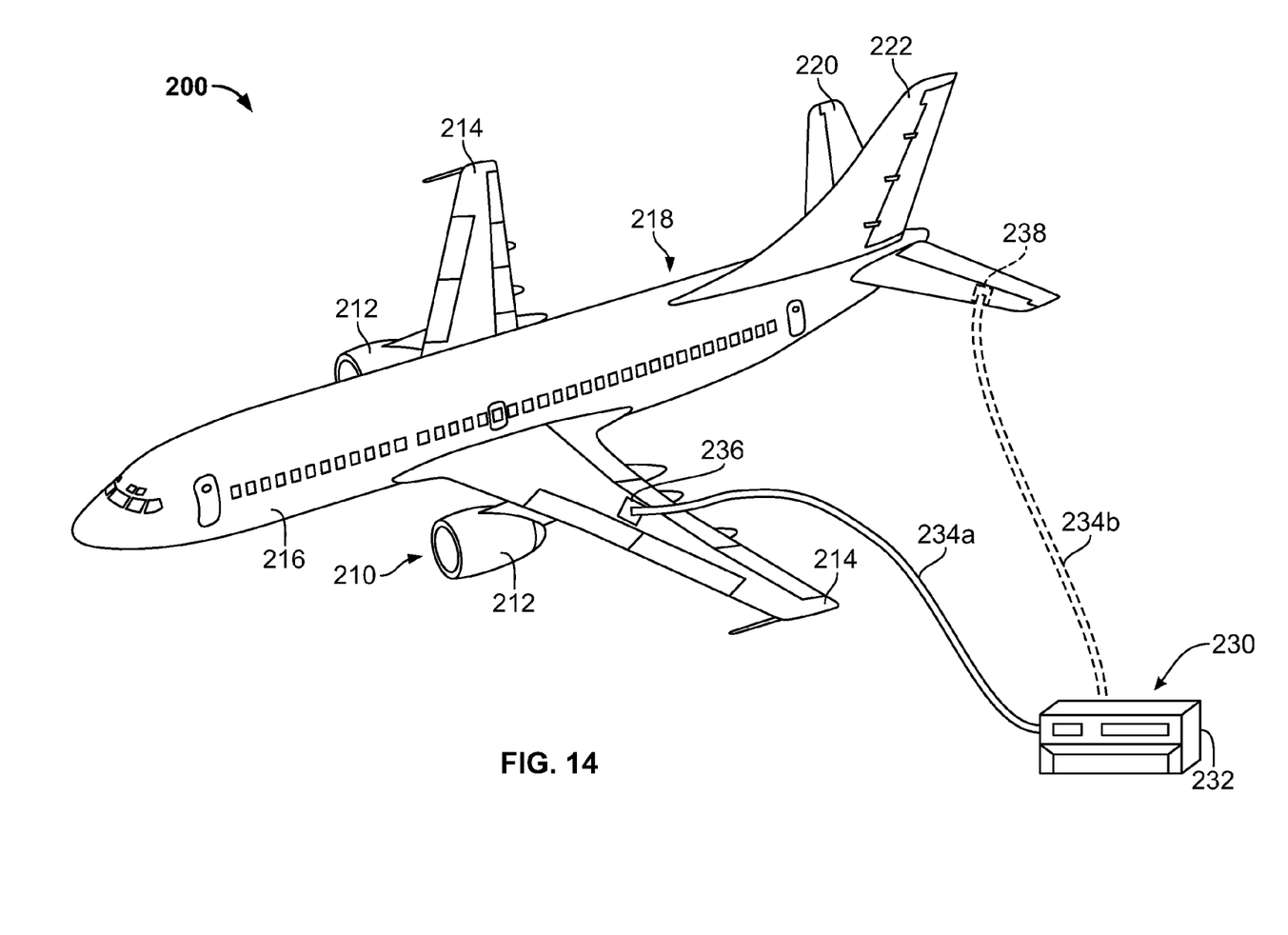
FIG. 14 is an illustration of an aircraft to which devices may be transported in accordance with various embodiments.

Thus, various embodiments provide a universal fastener that allows devices, such as fasteners of different types and/or sizes to be transported along the same transport tube. For example, various embodiments may be used to transport fasteners to an aircraft 200 as illustrated in FIG. 14. The aircraft 200 includes a propulsion system 210 that includes two turbofan engines 212. The engines 212 are carried by the wings 214 of the aircraft 200. In other embodiments, the engines 212 may be carried by a fuselage 216 (e.g., body of the aircraft 200) and/or the empennage 218. The empennage 218 can also support horizontal stabilizers 220 and a vertical stabilizer 222.

Thus, a feed end 230 may include, for example, a workstation 232 connected to a transport tube 234*a* for transporting devices, such as fasteners of different sizes to a point of use, shown as a workpiece 236 on the wing 214 of the aircraft. Other transport tubes 234*b*, for example, optionally may be provided, such as to transport fasteners to other portions of the aircraft 200, illustrated as a workpiece 238 on the horizontal stabilizer 220. It should be noted that the transport tubes 234*a* and 234*b* may have the same internal dimensions (e.g., diameter) or different internal dimensions, for example, based on the largest fastener to be transported to the particular portion of the aircraft 200.

It should be noted that the various embodiments or portions thereof, such as the systems described herein be implemented in hardware, software or a combination thereof. The various embodiments and/or components also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A transport system comprising:
   a transport tube having a feed end and a point of use end;
   a plurality of fasteners;
   a plurality of device carriers carrying the plurality of fasteners, wherein the plurality of device carriers comprises a common external surface, and openings having different configurations to accommodate different configurations of heads of different ones of the plurality of fasteners, at least some of the plurality of device carriers having a different internal configuration than at least some of the other ones of the plurality of device carriers, the internal configuration determined based on at least one physical characteristic of a fastener to be inserted therein; and
   a source operable to move the plurality of device carriers through the transport tube from the feed end to the point of use end, the plurality of device carriers having a common external surface to allow transport through the transport tube.

2. A method for transporting a plurality of fasteners to a point of use via a transport tube, at least some of the plurality of fasteners having different physical characteristics from other ones of the plurality of fasteners, the method comprising:
   configuring a plurality of carriers to have openings with different configurations to accommodate configurations of heads of different ones of the plurality of fasteners;
   receiving the plurality of the fasteners within a feed end of the transport tube, the plurality of fasteners disposed within the plurality of carriers configured to conform to different physical characteristics of the plurality of fasteners, wherein each carrier has an external surface configured for operation within the transport tube; and
   using a source to cause each of the plurality of device carriers to move along the transport tube from the feed end to the point of use.

3. The transport system of claim 1, wherein the plurality of device carriers have a cylindrical body and an external diameter of each of the plurality of device carriers is the same to define the common external surface.

4. The transport system of claim 3, wherein an internal diameter of a bore of at least some of the plurality of device carriers is different than an internal diameter of a bore at least some of the other ones of the plurality of device carriers to define the different internal configurations.

5. The transport system of claim 1, wherein the plurality of device carriers further comprise a retaining member therein, the retaining member operable to maintain a position of at least one of the plurality of fasteners within the device carrier.

6. The transport system of claim 1, wherein the plurality of device carriers further comprise a bore having an opening at one end configured to receive therein one of the plurality of fasteners and an end plug at an end of the bore opposite the opening, the end plug covering the end opposite the opening.

7. The transport system of claim 6, wherein the end plug is formed from a metal material.

8. The transport system of claim 1, further comprising one or more inserts to define the different internal configurations of the plurality of device carriers, the one or more inserts configured to be interested into any one of the plurality or device carriers.

9. The transport system of claim 1, wherein the feed end is located at a holding area for the plurality of fasteners, and the point of use end is located at a workpiece of an aircraft located remote from the holding area, the source using a pneumatic air pressure.

10. The transport system of claim 1, comprising a single transport tube operable to transport the plurality of device carriers.

11. The method of claim 2, further comprising configuring the plurality of carriers to have a cylindrical body and wherein an external diameter of each of the plurality of carriers is the same to define a common external surface.

12. The method of claim 2, further comprising configuring an internal diameter of a bore of at least some of the plurality of carriers to be different than an internal diameter of a bore at least some of the other ones of the plurality of carriers to conform to the different physical characteristics of the plurality of fasteners.

13. The method of claim 2, further comprising configuring the carriers to include a retaining member therein, the retaining member operable to maintain a position of one of the plurality of fasteners within the carrier.

14. The method of claim 2, further comprising configuring the carriers to have a bore with an opening at one end to receive therein one of the plurality of fasteners and an end plug at an end of the bore opposite the opening, the end plug covering the end opposite the opening.

15. The method of claim 14, further comprising forming the end plug from a metal material.

16. The method of claim 2, further comprising providing one or more inserts to conform to the different physical characteristics of the plurality of fasteners, the one or more inserts configured to be interested into any one of the plurality or carriers.

17. The method of claim 2, further comprising configuring the plurality of carriers to move through a single transport tube.

* * * * *